United States Patent [19]

Schneider

[11] Patent Number: 5,234,085
[45] Date of Patent: Aug. 10, 1993

[54] PILOT-CONTROLLED SHOCK ABSORBER

[75] Inventor: Steffen Schneider, Tamm-Hohenstange, Fed. Rep. of Germany

[73] Assignee: Robert Bosch GmbH, Stuttgart, Fed. Rep. of Germany

[21] Appl. No.: 890,191

[22] Filed: May 29, 1992

[30] Foreign Application Priority Data

Jun. 1, 1991 [DE] Fed. Rep. of Germany ....... 4118040

[51] Int. Cl.⁵ ............................................. F16F 9/34
[52] U.S. Cl. .............................. 188/322.15; 137/493.8
[58] Field of Search ............ 188/282, 299, 275, 322.15, 188/322.22, 319; 137/493.8, 516.21, 516.23, 543.21

[56] References Cited

U.S. PATENT DOCUMENTS

| 3,937,307 | 2/1976 | de Kock | 188/319 |
| 3,991,862 | 11/1976 | Tanabe | 188/282 |
| 4,113,072 | 9/1978 | Palmer | 188/282 |
| 5,129,488 | 7/1992 | Furuya et al. | 188/282 |
| 5,152,379 | 10/1992 | Sackett et al. | 188/319 |

FOREIGN PATENT DOCUMENTS 90567 8/1978 Japan ................................. 188/319

WO87/7565 12/1987 PCT Int'l Appl.
WO88/6983 9/1988 PCT Int'l Appl.

Primary Examiner—Robert J. Oberleitner
Assistant Examiner—Kevin D. Rutherford
Attorney, Agent, or Firm—Edwin E. Greigg; Ronald E. Greigg

[57] ABSTRACT

The invention is directed to a shock absorber in which the structure of both the main valve and the pilot control valve is simplified, and makes their operation less vulnerable to malfunction because the number of parts moved relative to one another is reduced. This is achieved by functionally uniting the valve plate and pressure plate in an especially embodied novel valve plate, in the form of an annular shim with a fingerlike toothed contour of the inside circumference, which pierces a corresponding contour of an axial region of a stroke limiter, as a result of which a guidance of the valve plate quite close to the force introduction points by means of a spring or the openings to be closed takes place, thereby preventing unilateral opening of a valve plate. The relief piston is sealed off from the pilot control chamber by means of one gap seal and one sealing ring, so that the production tolerances can be greater and as a result an original-shape method without remachining is possible in manufacture.

7 Claims, 2 Drawing Sheets

PILOT-CONTROLLED SHOCK ABSORBER

BACKGROUND OF THE INVENTION

As known from the U.S. PCT Publications WO87/07565 and WO88/06983, the piston of a shock absorber comprises the main valve embodied in the body of the piston and a pilot control chamber accommodated in it, which acts upon the valve plate of the main valve. The pressure of the pilot control chamber acts upon the valve plate via a relief piston, which is sealed off from the body by means of a gap seal, to avoid seizing at the inside circumference as well as on the outside circumference of its annular shape, and is acted upon by an additional compression spring. The opening existing in the relief piston from the pilot control chamber to the adjoining work chamber is reduced by means of a shim, placed on the inside, with an incorporated relatively small throttle restriction, and this shim in turn is pressed by another spring against the relief piston and that spring is retained in position in turn by a special guide element.

Because of the great number of individual moving parts, seizing can easily occur, and moreover the production of these individual parts is overall very expensive, especially since work must be done with relatively close tolerances because of the use of gap seals, so that as a rule only metal-cutting production methods, rather than deforming production methods, can be employed in manufacture.

The valve plate is guided with its inside diameter on the outside diameter of the neck joining the body of the piston to the piston rod and is acted upon by compression springs by means of a pressure plate. Because the spring forces do not always act centrally, it is possible that the valve plate may tilt unilaterally upward, unevenly—especially when the spring force is exerted upon a small diameter. Previously, no stroke limitation was provided.

In the interior of the neck, a pilot control valve is typically formed, which varies the pressure in the pilot control chambers of the main valve To that end, the neck is embodied as hollow on the inside, and in it, a slide sheath is first displaceable, resting tightly in the axial direction and traveling in it in turn is the actual slide, acting as a pressure balance; in the region of the radially communicating openings with the pilot control chambers, the actual slide has an annular groove, with the aid of which, given a suitable position, communication can be established between the two pilot control chambers.

On its other face end, this slide ends with an unaltered diameter at the face end of a likewise longitudinally hollow sheath, which is retained spaced apart from an electromagnet by a spring on the opposite end. This sheath has grooves on its outside circumference that communicate with the central bore and that effect sealing between the sheath and the slide sheath only by means of the face end toward the slide. When the electromagnet attracts, the sheath is displaced counter to the force of the spring and opens this seal, resulting in a relative shifting of the slide sheath and the slide and thus varying the free cross section of the communication between the pilot control chambers. The individual parts of this pilot control valve must be made with very close tolerances.

The neck is thrust into the end of the piston rod, where it is secured by a wave nut that simultaneously acts as a stop for one of the two compression springs of the main valve.

OBJECT AND SUMMARY OF THE INVENTION

As a result of the novel embodiment of the sealing plate, the function of the earlier sealing plate, embodied as thin and resilient, and of the more solidly embodied pressing plate is combined, so that the number of components is reduced since now the compression springs act directly upon the valve plate, in fact directly in the region of the mouths to be closed on the face end of the piston.

Since the toothed inside contour of the sealing plate extends as far as the vicinity of the mouths to be covered, and the fingerlike intermeshing of the toothed inner contour of the sealing plate and of the toothed outer contour of the axial region of the stroke limiter takes place there, the sealing plate is brought quite close to the mouths to be sealed. In contrast to previous embodiments, in which the sealing plate had a substantially smaller inside diameter, which made tilting about one of the inner peripheral points of the sealing plate and hence nonuniform opening of the main valves very much easier, this is no longer possible in the embodiment according to the invention. Not only are there fewer components in absolute numbers, but because of the identical embodiment of the valve plate, stroke limiter, and so forth for the tension and compression sides, fewer differently embodied individual parts are also present in a shock absorber.

As a result of the novel embodiment of the relief piston, an adequately exact machining is necessary at the diameter, which has the greater axial length and also functions as a gap seal, on the one hand, but not on the other circumferential face, which is for instance sealed off with a standard sealing ring. As a result, greater overall production tolerances are possible for the annular relief piston, which lowers the manufacturing costs and also affords the possibility of making this component by a sintering technique, for instance, and hence after the deforming without remachining.

Moreover, because of the omission of pressing springs and the guide pistons previously necessary for them, not only is the number of individual parts reduced, but in particular the number of components likely to malfunction, which can break or seize, is reduced. With the slit retaining ring, seizing or breakage would hardly be a threat to be feared, yet nevertheless the shim containing the throttle restriction can fulfill its function in the pilot control chamber as soon as a pressure is present in the pilot control chamber that is above the pressure of the adjacent work chamber, because at that time it is assured that the shim will rest on the inside shim of the relief piston.

Since in addition the stroke limiters rest with their free toothed face end on the face ends of the piston, and are supported with their radial portion on a suitable shoulder or wave nut of the neck that connects the piston and the piston rod, the basic body of the piston, which comprises a plurality of individual parts, is also held together axially solely by the force of the wave nut, so that in the region of the piston it is no longer necessary to perform a welding operation, in particular after assembly.

The novel embodiment of the pilot control valve located in the inside of the neck—especially because of the cooperation of the slide with a reduced face-end diameter with the adjoining sheath—dispenses completely with the slide sheath previously disposed concentrically between the slide and the neck. This provision likewise reduces both the manufacturing cost and the vulnerability of the arrangement to malfunction, and while having the same outside dimensions makes a greater material thickness for the neck possible, which is beneficial for the overall rigidity in the region of the piston and at the transition from the piston to the piston rod.

The mutual bracing of the individual parts also occurs as a result over a wider diameter in part, which likewise improves the rigidity. As a compromise, the diameter of the slide can be increased, which makes larger flow cross sections and thus a different response performance possible.

The production of the various diameters is also made easier and hence less expensive because they are enlarged.

Further economy in terms of individual parts becomes possible because the neck is not inserted into the face end of the piston rod and screwed to its outside diameter by a union nut, but instead screwing between an external thread on the neck and an internal thread in the piston rod takes place directly. The counter bearing then necessary for the spiral spring of the main valve, which was previously provided by the wave nut, is now afforded by means of an offset-bent retaining flange, which already serves on the opposite end of the piston as an abutment for the compression spring located there. With this kind of embodiment, it would also be recommended that the retaining flanges and stroke limiters, resting on one another in the same way on both sides of the piston, be united into one integral component.

With the absence of one union nut, this already reduces the number of individual parts, and additionally provides greater rigidity at the transition between the piston rod and the neck, and the useful length of the piston rod is increased as well.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
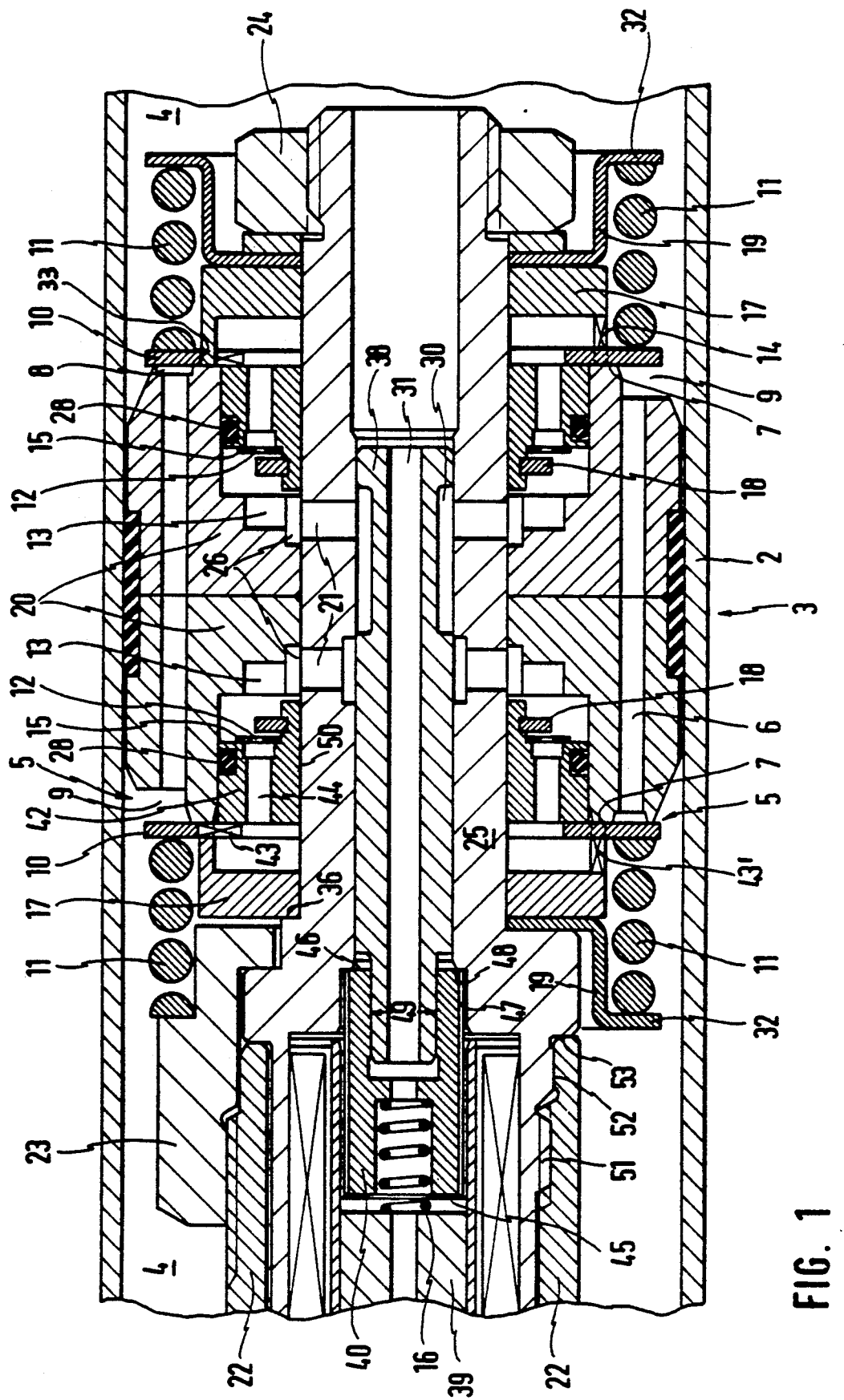
FIG. 1 is a longitudinal section through a shock absorber in the region of the piston.

FIG. 1 shows the piston 3, which is tightly displaceable in the cylinder 2 by means of the seal 29; it comprises the body 20 and various assembly parts and is firmly joined to the piston rod 22 via the neck 25.

The passages 6, each of which has an open mouth 9 and a mouth 8 that is closeable by the sealing plate 10, can be seen in the outer region of the piston 3; for the two flow directions, these mouths represent the main valve 5. The two valve plates 10 pressing against the face ends 7 of the piston 3 are each acted upon in the region of the mouths via helical springs 11 and in the contrary direction by relief pistons 42, the force of which depends on the pressure of the pilot control chambers 13 located behind each of them, which communicate with a pilot control valve in the interior of the neck 25 via an annular recess 26 in the piston 3 and radial openings 21 in the neck 25.

The stroke limiter 17 comprises a radial annular part, which is supported on a corresponding shoulder 36 of the neck 25, and an axial region 35, disposed on the outer circumference of the radial region 34; the face end of the region 35, ending in the open, because of the fingerlike, toothed embodiment extends through corresponding recesses of the sealing plate 10 and presses against the face end of the piston 3.

Figure 2:
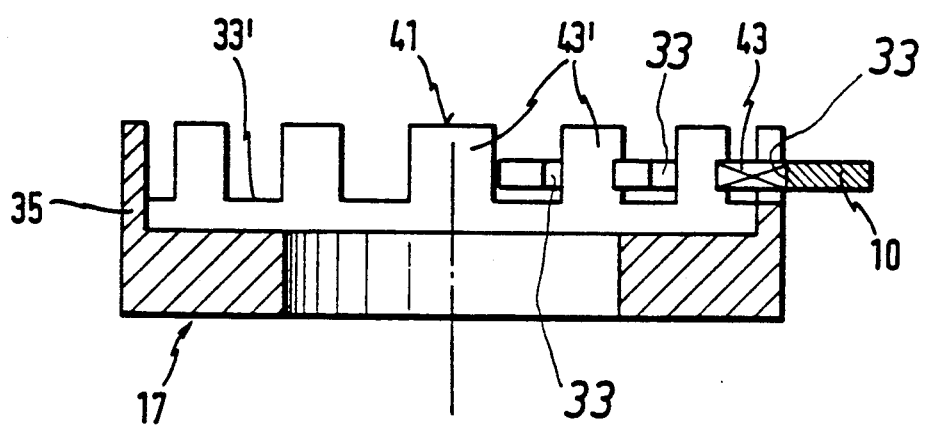
FIG. 2 is an enlarged detailed view of the stroke limiter and valve plate, in longitudinal section.

In the detailed view of FIG. 2, the stroke limiter 17 is shown on a larger scale in longitudinal section; in the right-hand half of the drawing, its cooperation with the valve plate ;0 is additionally shown.

In the left-hand half of FIG. 2, the indentations 33' disposed in the free face end 41 of the axial region 35 can be seen, which produce a tooth contour because of the regular succession of existing extensions 43'.

The penetration of the valve plate 10, which is correspondingly embodied on its inside circumference, by the toothed shape of the stroke limiter 17 can also be seen in the right-hand region of the drawing. The valve plate 10 is located transversely to the longitudinal axis of the arrangement, or in other words parallel to the radial regions 35 of the stroke limiter 17. The extensions 43 of the valve plate 10 extend through the indentations 33' of the stroke limiter 17, and their axial freedom of motion is limited by the axial end of these indentations 33', where they rest when the main valve 5 is fully open. The indentations 33' in the stroke limiter 17 therefore have a depth substantially greater than the thickness of the material comprising the extensions 43 of the valve plate 10. The stroke limiter 17 naturally has a coaxial opening in the middle of the radial region 34, with which opening it is thrust over the corresponding outside diameter of the neck 25.

As can be seen in FIG. 1, the extensions 43 of the valve plate 10 extend not as far inward as the radial region of the stroke limiter 17, but are at least in part located in front of an annular recess in the face end 7 of the piston 3, through which—along with the outer circumference of the neck 25 in this region—a pilot control chamber 13 is formed. Located in this pilot control chamber 13 is an annular relief piston 42. On its inside circumference, it has a greater axial length, and is sealed off there from the outer circumference of the neck 25 by means of a gap seal 50. On its outer circumference it is sealed off from the body 20 of the piston 3 by a sealing ring 28.

This relief piston 42 also has an opening 44 in the axial direction that furnishes communication from the pilot control chamber 13 to the adjacent work chamber 4, which because of the play in cooperation between the stroke limiter 17 and the pressure plate 10 communicates with the interior formed by the angled stroke limiter 17. This opening 44 is reduced by means of a shim 15 resting on the inside, which as a throttle restriction 12 of at least one, defined, small opening, so that when the pressure in the pilot control chamber 13 is higher, pressure equalization with the adjacent work chamber 4 is possible only with a time lag.

The shim 15 can move axially away from the counterpart face of the relief piston 42 as far as the retaining ring 18 firmly joined to the relief piston; in the present case, this ring is embodied as a snap ring in a groove in the outer circumference of the relief piston 42. If the pressure in the work chamber 4 is higher than that in the pilot control chamber 13, the shim 15 thus lifts away from the mouth of the opening 44 and makes a fast pressure equalization possible. The two pilot control chambers 13 communicate with one another via annular recesses 26 and radial openings 21 in the neck 25, which are axially separated, as long a the slide 38 is in such a position that its annular groove 30 extends from one radial opening 21 to the other.

The slide 38 slides with one end, having a reduced diameter 49, within a corresponding face-end recess of the magnet armature 40, which is axially hollow and which is supported on the other end on the electromagnet 39 via a spring 16 and maintains a spacing between the face end 45 and the electromagnet 39.

Longitudinally continuous grooves 47 are provided in the outer circumference of the magnet armature 40; with them, the magnet armature is guided in the neck 25 and the magnet armature 40 additionally rests, with the face end 46 toward the slide 38, on a corresponding shoulder 48 of the neck 25 because of the force of the spring 16.

Whether the magnet armature 40 rests with its right-hand face end 46 on the slide 38 depends on whether the force of the spring 16 acting on the other face end 45 is compensated for by activation of the electromagnet 39, which pulls the magnet armature 40 to the left.

In the upper half of the left hand end of FIG. 1, the connection between the neck 25 and the piston rod 22 is embodied so that the neck 25 is thrust into the hollow piston rod 22 as far as a corresponding shoulder on the neck 25 and is axially and radially fixed by a wave nut 23, which is screwed to an external thread of the piston rod 22. This wave nut 23 at the same time provides an abutment for the spring 11, which acts upon the left-hand valve plate 10.

In the lower half of the left hand end of the drawing, a version is shown in which the neck 25 has an external thread 51, which is followed by a radial seat 52 and a radial shoulder 53. The neck 25 is screwed into a corresponding internal thread of the piston rod 22, and the mutual position of the neck 25 and piston rod 22 is fixed by the radial seat 52 and the shoulder 53, which is embodied as an axial seat.

A retaining flange 32 that has an annular axial offset bend 19 serves as an abutment for the spring 11, resting on a corresponding shoulder on the outer circumference of the neck 25; in the identical shape in mirror reversal, it is also inserted as an abutment for the spring 11 between the wave nut 24 on the free right hand end of the neck 25 and the stroke limiter 17 at that location.

The foregoing relates to a preferred exemplary embodiment of the invention, it being understood that other variants and embodiments thereof are possible within the spirit and scope of the invention, the latter being defined by the appended claims.

What is claimed and desired to be secured by letters patent of the United States is::

1. A pilot-controlled shock absorber, comprising a cylinder (2) which is divided into two work chambers (4) by a tightly contacting displaceable piston (3), which is secured at one end on a piston rod (22), wherein the piston has at least one passage (6) from one face end to a second face end, one mouth (8) of said at least one passage is closeable by a valve plate (10) by means of a spring which exerts pressure on the valve plate (10) and as a result valve plate (10) forms a main valve, and wherein the valve plate (10) is acted upon in an opposite direction by a pilot control force, the annular valve plate (10) has a toothed inner contour including an inside (43) and indentations (33) which extend to just before the mouths (8) to be covered, and the valve plate (10) is held in position by a stroke limiter (17), which has an axial region (35) with a free face end (41) of which is toothed to form indentations (33') which receives extensions (43) of the valve plate (10) and vice versa, said indentations (33') are embodied as deeper than a thickness of the valve plate (10) and include extensions (43') of the stroke limiter which come to rest at a bottom of the recesses (33) of the valve plate (10).

2. A shock absorber as defined by claim 1, wherein the valve plate (10) is acted upon on its inside (43) by a relief piston (42) which functions in an annular recess (26), forming a pilot control chamber (13), on a face end (7) of a body (20) of the piston (3), the inner and outer circumferential faces of the relief piston (42) are sealed off from the body (20) by means of an axial gap seal (50) and a sealing ring (28), respectively.

3. A shock absorber as defined by claim 2, in which the relief piston (42) includes an opening (44), extending from the pilot control chamber (13) to the work chamber (4), the opening (44) in the relief piston (42) is reduced on the side of the pilot control chamber (13) by means of an emplaced shim (15) having a throttle restriction (12), an axial play of said shim (15) is limited by a retaining ring (18) secured in the relief piston (42) and which protrudes in part radially in front of the shim (15).

4. A shock absorber as defined by claim 3, wherein a neck (25) connects the body (20) to the piston rod (22) and is embodied as longitudinally hollow and has at least two axially separated radial openings (21), which are connected at their inner mounts by means of an annular groove (30) in an outer circumference of a slide (38) sliding tightly in the neck (25), the neck (25) is axially firmly joined to the piston rod (22), and one end of the slide (38) terminates tightly but displaceably with a reduced diameter (49) in a face end (46) of a longitudinally hollow magnet armature (40), wherein the magnet armature (40), by a face end (45) remote from the slide (38), is acted upon by an axial force and has longitudinal grooves (47) on its circumference, which when the other face end (46) lifts from a corresponding shoulder (48) of the neck (25) uncovers a hydraulic communication from a central bore (31) to the face end regions of the slide (38) outside a diameter (49).

5. A shock absorber as defined by claim 2, wherein a neck (25) connects the body (20) to the piston rod (22) and is embodied as longitudinally hollow and has at least two axially separated radial openings (21), which are connected at their inner mounts by means of an annular groove (30) in an outer circumference of a slide (38) sliding tightly in the neck (25), the neck (25) is axially firmly joined to the piston rod (22), and one end of the slide (38) terminates tightly but displaceably with a reduced diameter (49) in a face end (46) of a longitudinally hollow magnet armature (40), wherein the magnet armature (40), by a face end (45) remote from the slide (38), is acted upon by an axial force and has longitudinal grooves (47) on its circumference, which when the other face end (46) lifts from a corresponding shoulder (48) of the neck (25) uncovers a hydraulic communication from a central bore (31) to the face end regions of the slide (38) outside a diameter (49).

6. A shock absorber as defined by claim 5, in which the neck, on one end, has an external thread (51) which is followed by a circumferential seat (52) and a radial, outwardly oriented shoulder (53), so that by means of the external thread (51) the neck can be screwed into a corresponding internal thread in the face end of the piston rod (22) until the contact of the face end of the piston rod contacts a shoulder (53).

7. A shock absorber as defined by claim 1, in which a relief piston (42) includes an opening (44), extending from a pilot control chamber (13) to the work chamber (4), the opening (44) in the relief piston (42) is reduced on the side of the pilot control chamber (13) by means of an emplaced shim (15) having a throttle restriction (12), an axial play of said shim (15) is limited by a retaining ring (18) secured in the relief piston (42) and which protrudes in part radially in front of the shim (15).

* * * * *